Aug. 21, 1923.
J. GUTH
1,465,432
TRACTOR WATER COOLING DEVICE
Filed June 13, 1921
Fig. 1.
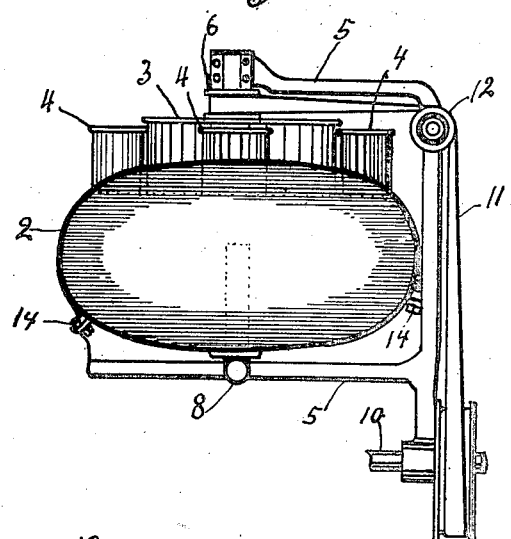
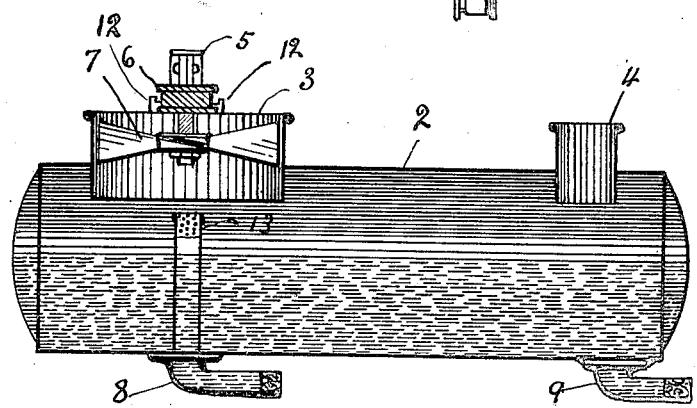
Fig. 2
WITNESS:
INVENTOR.
Jacob Guth Patented Aug. 21, 1923.

1,465,432

UNITED STATES PATENT OFFICE.

JACOB GUTH, OF ST. LOUIS, MISSOURI.

TRACTOR WATER-COOLING DEVICE.

Application filed June 13, 1921. Serial No. 477,332.

*To all whom it may concern:*

Be it known that I, JACOB GUTH, a citizen of the United States, residing at 1109 High Street, in the city of St. Louis, State of Missouri, have invented a certain new and useful Improvement in Tractor Water-Cooling Devices, of which the following is a full, clear, and exact description, such as will enable others skilled in the art to which it appertains to make and use the same, reference being had to the accompanying drawings, forming part of this specification.

My invention relates generally to a tractor water cooling device. The principal object of my invention is to produce a simple, durable and efficient water cooling mechanism which is arranged to blow air directly on a heated spray of water and cause a draft through the tank containing the water from one end to the opposite end.

In my improved cooling system is a horizontal driven fan with a casing around the same secured on top of the tank near one end and three tubular draft openings near the opposite end; the fan is driven by the engine, the air is forced into the tank on the hot water thus causing a draft on the water to the opposite end and out at the tubular openings. The hot water is sprayed into the tank through a sprayer arranged directly beneath the fan. This construction makes a very efficient water cooler.

With the foregoing and other objects in view, my invention consists in certain novel features of construction and arrangement of parts, hereinafter more fully described and claimed, and illustrated in the accompanying drawing, in which,—

Fig. 1 is an end view of my device.

Fig. 2 is a vertical sectional view.

Referring by numerals to the accompanying drawings which illustrate a practical embodiment of my invention: 2 designates a water tank which is kept partly filled, 3 is the fan casing; 4 designates three tubular openings which project above and below the tank to prevent water splashing out; 5 is the belt and fan frame; 8 is the inlet of the tank; 6 is a belt pulley; 7 is a fan; 9 is the outlet of the tank; 10 is an engine pulley; 11 is a belt driven by the engine pulley 10 running over two small guide pulleys; 12 to the fan pulley 6; 13 is a sprayer in the tank; 14 are lugs to connect the tank to the frame 5. The air is forced into the tank on the spray of water then towards the opposite end and out thus causing a draft on the water.

This cooling mechanism has given satisfactory results with a force pump in connection.

It will be readily understood that minor changes in the size, form and construction of the various parts of my improved cooling system can be made and substituted for those herein shown and described, without departing from the spirit of my invention, the scope of which is set forth in the appended claims.

1. A cooling device having a horizontal water tank, a fan operating horizontally above the tank near one end; a casing for said fan projecting above and below the upper part of said tank; a plurality of tubular openings near the opposite end, projecting above and below the upper part of said tank; a fan to direct a current of air on the water in said tank so as to cause a draft towards the opposite end.

2. A cooling device having a horizontal water tank having an inlet and an outlet; a fan operating horizontally above the tank near one end; a casing for said fan projecting above and below the upper part of said tank; a plurality of tubular openings near the opposite end projecting above and below the upper part of said tank; a fan adapted to blow on the water in said tank and cause a draft to the opposite end and a sprayer on the end of said inlet near said fan in said tank.

In testimony whereof, I have hereunto affixed my signature this 10th day of June, 1921.

JACOB GUTH.